Figure 1:
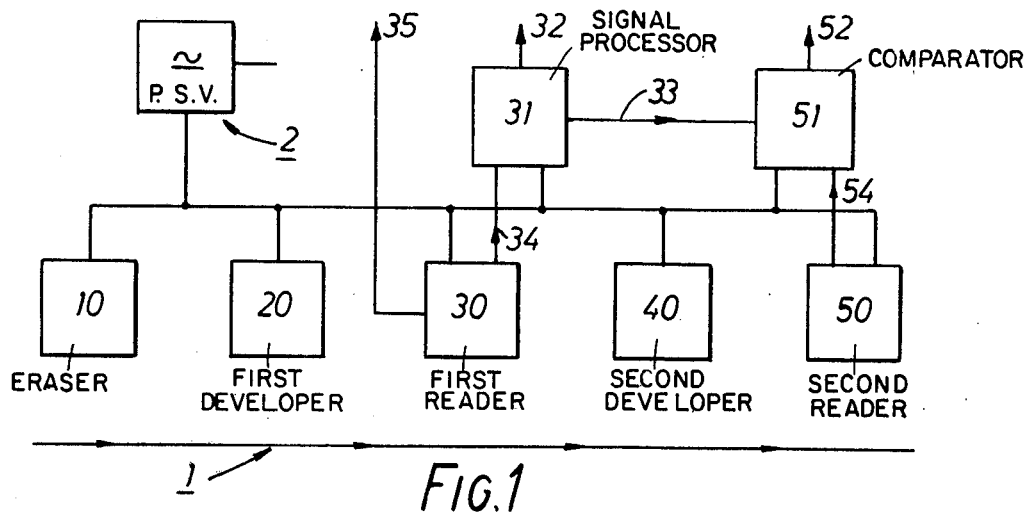

United States Patent [19]

Lee

[11] 4,038,596
[45] July 26, 1977

[54] METHOD AND APPARATUS FOR AUTHENTICATING A RECORD MEDIUM CONSISTING OF APPLYING TWO DIFFERENT STRENGTH MAGNETIZING FIELDS AND MONITORING THE REMANENT FIELDS

[75] Inventor: Cyril Arthur Lee, Maidenhead, England

[73] Assignee: E M I Limited, Hayes, England

[21] Appl. No.: 592,669

[22] Filed: July 2, 1975

[30] Foreign Application Priority Data

July 4, 1974 United Kingdom ............... 29663/74

[51] Int. Cl.$^2$ ............................................. G01R 33/12
[52] U.S. Cl. ................................ 324/34 R; 235/61.7 B; 235/61.11 D; 235/61.12 M; 340/149 A
[58] Field of Search ..................... 324/34 R, 34 H; 340/149 A; 235/61.11 D, 61.12 M, 61.7 B

[56] References Cited

U.S. PATENT DOCUMENTS

| | | | |
|---|---|---|---|
| 2,254,933 | 9/1941 | Bryce | 235/61.11 D |
| 3,627,934 | 12/1971 | Riddle | 340/149 A |
| 3,702,133 | 11/1972 | Vibert et al. | 209/111.8 |
| 3,873,975 | 3/1975 | Miklos et al. | 340/149 A |
| 3,927,393 | 12/1975 | Fayling | 340/149 A |

FOREIGN PATENT DOCUMENTS

| | | | |
|---|---|---|---|
| 1,304,531 | 1/1973 | United Kingdom | 324/34 R |
| 1,331,604 | 9/1973 | United Kingdom | 235/61.11 D |

Primary Examiner—Robert J. Corcoran
Attorney, Agent, or Firm—Fleit & Jacobson

[57] ABSTRACT

Apparatus to examine a magnetic storage layer expected to contain a magnetic watermark includes means to magnetize the layer with a unidirectional field of a selected strength without saturating it and means to detect any distinct region of magnetic remanence. The apparatus may further include means to record the resultant remanence levels (or their ratio) for such a region and another part of the layer, means to magnetize the layer with a unidirectional field of a different selected strength, means to detect any then-existing such distinct region or regions, means to measure the remanence levels (or their ratio) for the then-existing such region and another part of the layer, and means to compare the measured and recorded levels (or their ratios) and indicate from the result of the comparison whether or not this represents a layer having a magnetic watermark of regions of distinctly aligned anisotropic magnetic particles. The use of different amounts of magnetization will produce different ratios of remanence in a layer having such a watermark but not in an homogenous layer.

11 Claims, 4 Drawing Figures

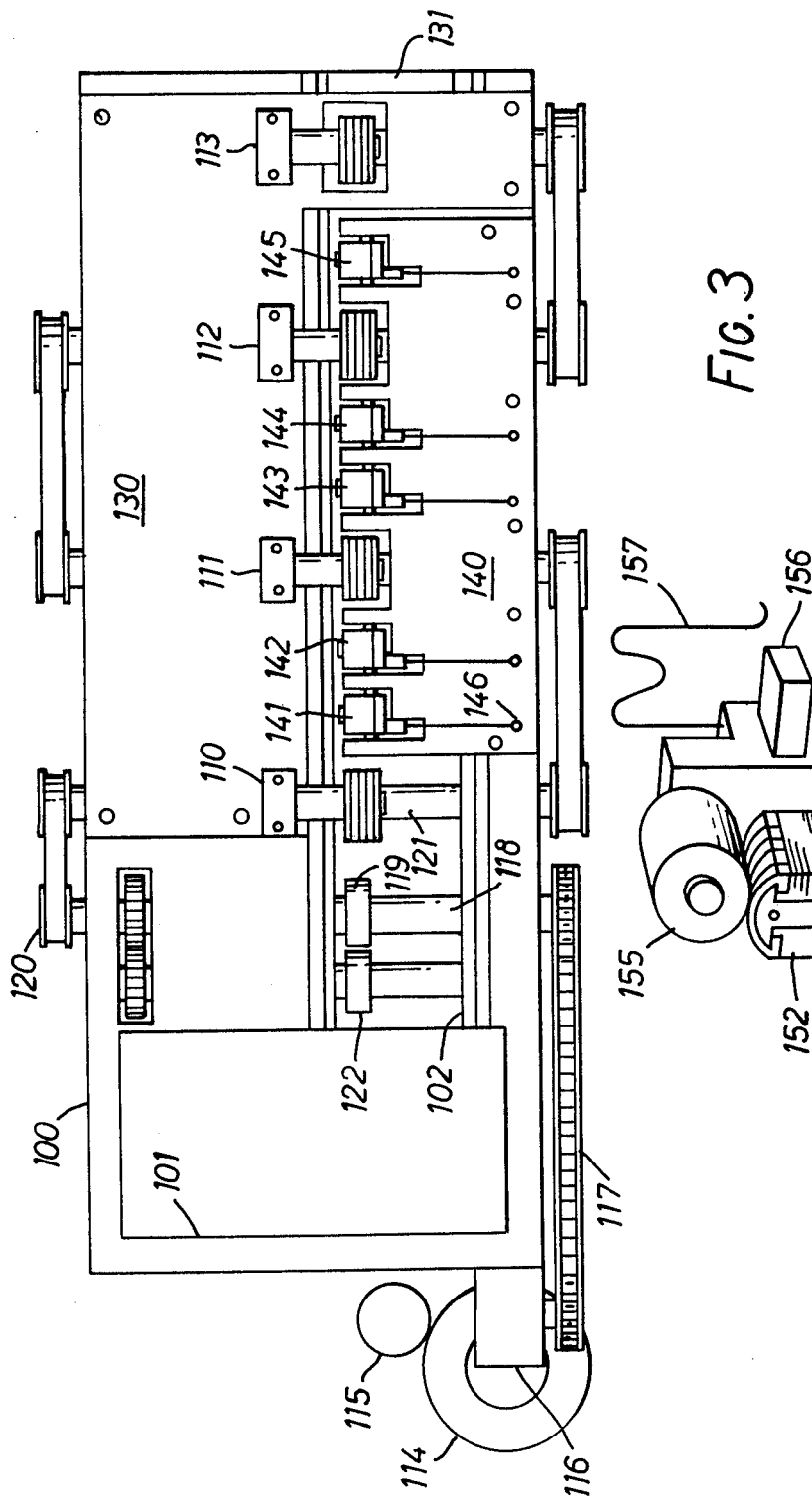

METHOD AND APPARATUS FOR AUTHENTICATING A RECORD MEDIUM CONSISTING OF APPLYING TWO DIFFERENT STRENGTH MAGNETIZING FIELDS AND MONITORING THE REMANENT FIELDS

This invention relates to the examination of magnetic storage layers and in particular such layers which, as a result of the method of manufacture, exhibit an inherent pattern of magnetization when magnetized.

Typically such a layer has a permanently structured assembly of magnetic particles in which some particles with a preferred axis of magnetization, which may be acicular particles, have their preferred axes arranged to form a distinct part of said structure. The magnetic particles may be in a proportion selected to be less than the maximum possible in a layer so that the orientation ratio may be higher than at said maximum proportion. Such a permanently structured medium may be incorporated in accordance with various proposals already made or otherwise into documents, bank notes, cheques, pass cards or the like as a so-called "magnetic watermark". The layer may include particles having a preferred axis of magnetization aligned to form a pattern in the permanent structure.

In order to examine such layers, whether incorporated as described above or not, to establish their validity and to extract recorded information it is known to apply a magnetic field strong enough to saturate the magnetic particles of the layer and then detect any remanence or difference in remanence levels between parts of the layer. Such a procedure is satisfactory but is firstly difficult in that the remanence levels in the pattern and the rest of the layer are not very different and is secondly open to deception in that it may be possible to simulate a pattern by changing the thickness of a part of the layer It is an object of the invention to provide, for the examination of magnetic watermarks, a method of testing and an apparatus to ease the difficulty of detecting remanence level differences and to be more resistant against deception.

According to the invention there is provided in a method of examining a magnetic storage layer expected to contain a magnetic watermark:

a. treating the layer to remove magnetization exhibited by the medium, b. subjecting the treated layer to a first unidirectional magnetizing field, to magnetize it to below saturation, c. detecting any distinct remanence region of the layer.

The step of detecting a distinct remanence region may include the extraction of information stored as the particular physical form of said region and/or the comparison of remanence levels which may be those of the first region and another part of the layer.

Magnetization may be removed by applying an alternating magnet field whose amplitude is slowly reduced.

The method of examining the layer may include in addition:

d. recording the remanence levels of the distinct region and another part of the layer (or their ratio), e. subjecting the layer to a second unidirectional magnetic field of strength different from the first field, f. detecting any then-existing distinct remanence region of the layer, g. measuring the further remanence levels or their ratio for said distinct region and said another part of the layer, h. comparing the recorded levels and measured further levels or their ratios, j. indicating the result of the comparison.

The additional steps may be carried out before or after the steps previously described.

The first and second distinct regions may be co-extensive.

According to the invention there is also provided apparatus to examine a magnetic storage layer expected to contain a magnetic watermark including:

a. means to destroy magnetism exhibited by said medium, b. means to apply to the demagnetised layer a first magnetic field of a selected strength insufficient to saturate it, and c. means to detect any distinct region of remanence.

The apparatus may in addition include:

d. means to record the remanence levels of any said distinct region and another part of the layer (or their ratio), e. means to apply to the layer a second magnetic field of selected strength higher than that of said first field, f. means to detect any then-existing distinct region of remanence, g. means to measure the further remanence levels or their ratio for said distinct region and another part of the layer, h. means to compare the recorded and measured levels or their ratios, j. means to indicate the result of said comparison.

The apparatus may include means to read information stored as the particular physical form of a distinct region or the relationship of several such regions, the presence of which regions has been detected. The information may be read by means to record or means to compare remanence regions. The apparatus may include means to display the extracted information in dependence on the result of said comparison.

The apparatus may be arranged to verify an object such as a pass-card purporting to include said magnetic storage layer and may be associated with means to accept, transport for examination and release said object or retain it as appropriate.

In a preferred form of the method or apparatus for use with a commercial grade gamma $Fe_2O_3$ permanently structured magnetic storage layer including longitudinally and traversely aligned particles the first field has a strength of some 450 oersted and the second field a strength of some 1000 oersted.

Figure 2:
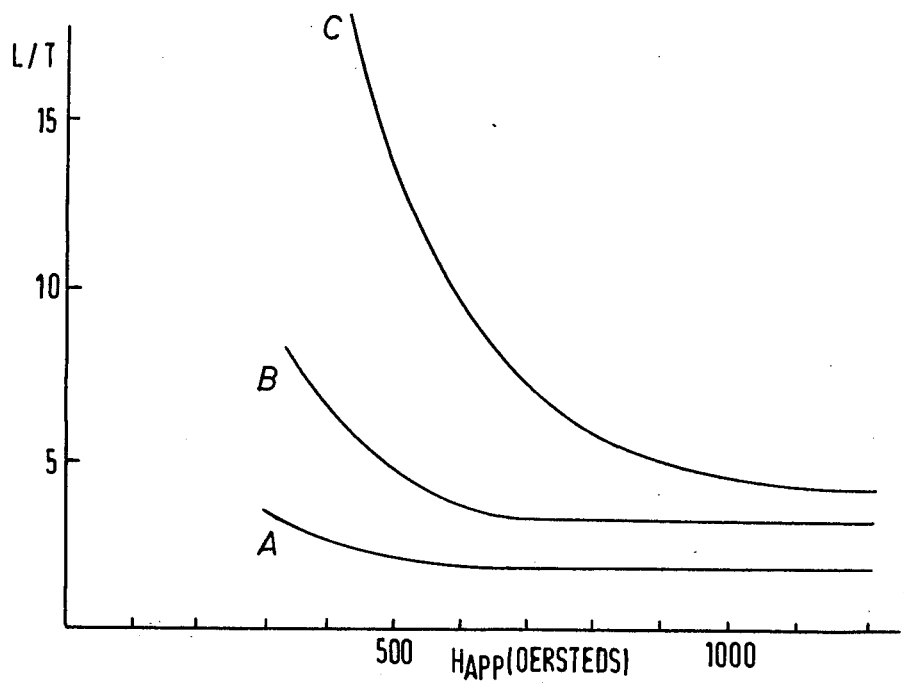

Embodiments of the invention will now be described with reference to the accompanying drawings in which:

FIG. 1 is a block schematic circuit diagram of apparatus to examine a magnetic storage layer, and FIG. 2 shows graphs indicating a parameter of certain magnetic materials usable in the invention, and FIG. 3 is a perspective view of an apparatus according to FIG. 1, a detail of which apparatus is shown in FIG. 4.

It is known to produce magnetic storage layers including one or more regions whose preferred direction of magnetization is distinct from that of another part of the layer or from each other. Such layers are often on a support and form a storage medium. For example acicular particles of gamma $Fe_2O_3$ can be selectively aligned during deposition of a magnetizable film on a support to produce a layer whose remanence when measured in two oblique directions is distinct and, by applying such alignment to a region of a layer, a region of potentially distinct remanence is formed. Preferably the particles of the remaining part of the medium are aligned in a direction other than to that of the distinct region, rather than left at random, to increase the inherent ratio between the remanence levels of the aligned and unaligned particles on magnetization by a unidirectional field. Remanence as used herein means the residual magnetism of a medium which has been subject to a unidirectional magnetic field.

Since such layers have been produced they have been used in "keys," documents, bank notes, cheques and the like objects, bearing identifiable information in the form of their regions of distinct remanence. In using the object the information has to be extracted and to prevent simulation of an object the information must be verified. Verification has hitherto been by applying to a layer to be examined a magnetic field strong enough to saturate the magnetic material before measuring the levels of the remanence in the layer and thus prevent the simulation of a valid object by magnetizing a layer in the appropriate pattern. This step of saturating the layer to bring out the magnetic pattern is called "Development." However this method has the disadvantage that a high field strength must be used and there is not a great difference in the remanence zones of differently aligned acicular particles after the application of unidirectional magnetic field.

Accordingly it is now proposed to use a lower strength to field to "Develop" the inherent magnetization pattern and, to overcome any attempted simulation of the pattern by selectively applied magnetization of the layer, to apply before the "developing" step an erasing step e.g. by using an alternating magnetic field of diminishing strength. In this way instead of the layer being saturated during development the medium will exhibit little or no magnetization before development and need not be saturated during development to destroy "written" information. A consequence of the reduced level of applied magnetic field strength is to increase the ratio between the remanence measured for a distinct region and the remanence measured for another part of the medium, both having been subjected to the same or a similar intensity of unidirectional magnetic field.

FIG. 1 shows in schematic form an apparatus for carrying out the "development" in this way. The apparatus is shown as a series of stations each of which would carry out one operation in turn on a piece of magnetic medium moved past them. Other arrangements are of course possible.

Reference 10 indicates a source of an erasing field. This may be an alternating field of suitable frequency, e.g. a power line frequency such as 50 or 60Hz, the action of which is reduced slowly to zero, e.g. by movement of the medium or reduction of the energy in the field. The medium is then moved along the path indicated at 1 to a first developing station 20. This is energized to supply a steady unidirectional field chosen to have a strength insufficient to saturate the magnetic material but of sufficient strength to magnetize it, e.g. some 450 oersteds in the preferred embodiment. When the remanence of the magnetized medium is measured the measurements for areas of differently aligned magnetic particles will differ. Item 30 is a reading device which detects the presence of any such differences. In a simple arrangement the mere detection of regions of different remanence may be sufficient. A signal to this effect may be supplied over conductor 35. However in a more complex arrangement it may be necessary to determine the physical form, including the position and/or size of a region. Accordingly the item 30 is arranged to identify the position and measure the different remanences and a signal from item 30 indicating the change of remanence is fed over conductor 34 to item 31 which reads the changes as information and supplies this over conductor 32. By using the above-mentioned chosen field - strength at item 20 the signal received over line 34 is greater than would be received if item 20 generated a field sufficient to saturate the material, as has been done hitherto. Items 30 and 31 may also be arranged to act in combination to measure the actual or relative levels of remanence and supply the measurements over conductor 33.

The arrangement thus far described using elements 2, 10, 20, 30 is sufficient to identify that an object presented thereto does have a watermark such as a region of distinctly aligned magnetic material and using item 31 to read information from the region. This gives an enhanced degree of accuracy to any examination of presented objects to detect forgeries or other fraudulent objects in that the erasing field eliminates written-in magnetization and the reduced level field from 20 increases the ratio of the remanence. FIG. 1 also shows how the arrangement can provide further checking of the authenticity of an object. Item 40 to which the object is presented after the reading at item 30 has been recorded is a source of a magnetic field of a different strength, preferably sufficient to saturate the magnetic medium, say 1000 oersteds in the preferred embodiment. The medium is then passed, along the direction 1, to a further reading device 50, which could be item 30 if a suitable sequence is arranged at which the remanence level or ratio is also measured and recorded or registered if necessary. The resulting ratio from this measurement is passed over conductor 54 to a comparator 51 which also receives the recorded remanence measurement from items 30 and 31 via conductor 33. For a given magnetic medium and strengths of magnetic field the two remanence ratios will be in a known relationship and have known values. Accordingly the comparator will, by indicating whether or not these ratios are correct, indicate whether or not an authentic object or medium has been presented. Outputs 35 and 52 can indicate the authenticity of the medium while output 32 can also supply any information read from the medium. Item 2 in FIG. 1 indicates a power supply source for the units of the apparatus.

A typical gamma $Fe_2O_3$ medium which is suitable is one whose measured remanence ratio at 450 oersteds is approximately 2.2 and at 1000 oersteds is 1.7. In the apparatus described a similar ratio will be obtained although the actual value may not be the same.

As described above the ratios of the remanence levels are the criteria for comparison but it would also be possible to compare actual values if desired.

FIG. 2 shows graphs of the variations of the value of the ratio of longitudinal to transverse remanence (L/T) for a range of values of applied magnetic field $H_{(app)}$ for three magnetic medium materials. These graphs express the results of laboratory measurements but are none the less a good guide to the ratios to be obtained in apparatus as described above. Graphs A and B are of gamma $Fe_2O_3$ material, that in graph B having the greater acicularity, while graph C is of $CrO_2$ material. The significance of the effect of the reduction of the applied field on the remanence ratio is shown very clearly, this permits the information recorded in the pattern in the medium to be retrieved more easily while at the same time the difference between the ratios at different applied fields permits the genuineness of the information to be proved. From these graphs suitable values of the first and second magnetic fields would be some 350 to 600 oersteds and 850 and 1200 oersteds respectively.

As explained above the three units 10, 20, 30 of the arrangement of FIG. 1 provide a check of considerable reliability at improved signal levels on the authenticity of the presented object or medium while the addition of units 40 and 50 greatly enhances the reliability of this check. Similarly the correctness of information read from a magnetic medium of the object is improved. The arrangement in either form will not produce an "authentic" response to attempts to deceive in which selected areas of a magnetic medium are magnetized and the arrangement in the latter form will not produce an "authentic" response to such attempts in which the thickness of selected areas is changed as these areas, when erased and then magnetized, will have substantially identical remanence ratio at all values of applied magnetic field.

The apparatus shown in FIGS. 3 and 4 is a reader and verifier for the detection of magnetic patterns on cards such as the plastics cards with a strip of magnetisable material and used as credit cards and the like. The apparatus shown in FIG. 3 is without the covers or container in which it would be enclosed in use to make it proof against tampering.

The apparatus includes a chassis 100 on which the remainder is mounted. The chassis has a longitudinal groove 102 for the card to slide in under the action of the transport mechanism formed by the roller drive units indicated at 110, 111, 112 and 113 resiliently mounted on a plate 130. The transport mechanism is powered by an electric motor 114 with associated starting and control unit 115 which, through a gear box 116 and a chain drive 117, rotates a shaft 118 which carries a rubber drive roller 119 and a pulley 120 for a toothed belt drive to a shaft 121 associated with roller drive unit 110. Each roller drive unit 110, 111, 112 and 113 has an associated shaft and rubber drive roller linked by toothed rubber belts and pulleys to shaft 120. The entrance to the groove 102 is at 131 and a card is inserted here to pass beneath a limb of plate 130 under the action of drive unit 113 and then along the groove under the subsequent action of units 112, 111, 110 until the twin contra-rotating rollers 119 and 122 push the card into a hopper 101 in chassis 100. In addition to the mechanical drive described above the apparatus has a magnetic head unit on plate 140. This plate is attached to chassis 100 and supports five heads sub-assemblies 141 to 145 in the path of the card along groove 102 so that the magnetic strip passes over the heads in turn and is pressed into contact with them by pressure rollers in each head sub-assembly.

An enlarged view of a typical head sub-assembly is included in FIG. 4. This head is read-out head and heads 141 and 143 are of this type. The head is a stack of laminations 151 of high permeability metal on two limbs of which stack are wound parts of a coil 152. The stack of laminations is held to a support 153 by a brass plate and screws 154. The support 153 carries a pressure roller 155 in a resilient bearing so that a controlled contact pressure of the card against the head is obtained as the card passes over the head. The support 153 has extensions 156 at each side by which it is pivotally attached to plate 140. The pivotal movement of the head is controlled by two springs which act between it and plate 140. A bent wire spring 157 is housed in a hole such as 146 of plate 140 and a leaf spring, not shown, is attached to the rear of support 153 and bears against plate 140. Two other types of head are used in the apparatus but all are mechanically similar and differ only in that head 145 has a coil to make it suitable for use as an erase head while heads 144 and 142 have permanent magnets instead of laminations and coils to provide the required "development" field strengths. Clearly other forms of development head, for example using coils and energised by passing a suitable current, are possible.

In operation the card inserted at 131 as described above is moved by drive units 113, 112, 111 and 110 to pass over the heads 145, 144, 143, 142, 141 in turn at a speed determined by the rotation of the pulleys such as 119 attached to the respective shafts connected by drive belts. The card is gripped between the resiliently mounted rollers of units 110 etc. and the rubber pulley, not shown, which cooperate with them. The heads 141 to 145 are mounted as described to ensure that the head can move freely to follow the card's movement while driven along groove 102 and thus enable good contact with the magnetic strip of the card.

The motor 114 is mounted as shown so that its magnetic field is small around the heads 141 to 145.

The electrical and electronic circuitry for the reader/verifier is housed under chassis 100. The form of the circuitry is not described in detail as suitable forms are well-known and readily constructed by those skilled in the art to meet the requirements given in the above description. The motor can be controlled to reverse the drive units to return the card to the user through gap 131. Cards passed to hopper 101 can be retained or returned as appropriate to the system in which the reader/verifier is used. The electronic circuitry is responsive to the signals from the read-out heads to carry out the verification process and provide a suitable indication or permit or prevent an action by the supply of appropriate signals to connected equipment.

What I claim is:

1. A system for examining a record medium expected to include a magnetic material storage layer exhibiting an inherent pattern of magnetic remanence difference between a part of the layer and another part of the layer when both parts are subjected to a uniform magnetising field including
    means for applying to the layer in turn at least two different strength magnetising fields along the same direction,
    means for measuring the relative remanent magnetisation in said part and said another part for each said magnetising field, and
    means responsive to the measurements to assess the authenticity status of the medium, the relative remanent magnetisations differing for said different strength magnetising fields for an authentic medium.

2. A system as claimed in claim 1 in which one of the selected strengths of magnetising field is that to magnetise the expected material to saturation in the field direction.

3. A system as claimed in claim 1 in which one of the selected strengths of magnetising field is between 350 and 600 oersteds and less than that to magnetise the expected material to saturation in the field direction.

4. A system as claimed in claim 1 in which the relative remanent magnetisation is measured as a ratio.

5. A system as claimed in claim 1 further including
   a. means to destroy magnetisation of said layer, prior to applying the magnetising fields
   b. one of said magnetising fields applied to the layer with destroyed magnetisation being a magnetising field of strength selected to magnetise the layer without saturating it,
   c. said measuring means including means to measure and to record the remanence levels of resultant distinct regions of different remanence levels in response to said one field,
   d. another of said magnetising fields applied to the magnetised layer being a magnetising field of strength selected to magnetise the layer to a different magnetisation,
   e. said means to measure including means to measure the remanence levels of resultant distinct regions of different remanence levels in response to said another field,
   f. said responsive means including assessment means to compare the recorded and the measured levels, and additionally
   g. means to indicate the authenticity status of the medium as a result of the comparison of said recorded and said measured levels, the compared levels differing for authentic medium.

6. A system according to claim 1 in which said means to measure remanence levels includes a means which is arranged to detect the position of said distinct regions by remanence changes and to read information stored as the position of said regions in the layer, the system including means to provide an output signal of such information and the authenticity status thereof.

7. A system as claimed in claim 1 arranged to verify an object purporting to include a magnetic storage layer having a magnetic watermark and including means to accept, transport for examination and release said object or retain it as appropriate, the system also supplying an output signal indicative of the authenticity status of the object.

8. A system as claimed in claim 7 arranged for use with a security device incorporating a magnetic storage layer including commercial grade gamma $Fe_2O_3$ permanently structured by having longitudinally and transversely aligned particles and in which the strengths of the magnetising fields are some 450 oersteds and some 1000 oersteds.

9. A method of examining a record medium expected to include a magnetic material storage layer exhibiting an inherent pattern of magnetic remanence difference between a part of the layer and another part of the layer when both parts are subjected to a uniform magnetising field, including
   applying to the layer in turn at least two different strength magnetising fields,
   measuring the relative remanent magnetisations in said part and said another part for each said field and
   assessing the authenticity of the medium from the measurements, the relative magnetisation differing for different strength magnetising fields for an authentic medium.

10. A method according to claim 9 including applying one of said magnetising fields at a strength sufficient to magnetically saturate the expected material in the field direction.

11. A method according to claim 9 including applying one of said magnetising fields at a strength between 350 and 600 oersteds and less than the strength sufficient to magnetically saturate the expected material in the field direction.

* * * * *